United States Patent
McNab, Jr. et al.

(10) Patent No.: US 6,431,281 B1
(45) Date of Patent: Aug. 13, 2002

(54) CATALYTIC DESTRUCTION OF GROUNDWATER CONTAMINANTS IN REACTIVE EXTRACTION WELLS

(75) Inventors: Walt W. McNab, Jr., Concord; Martin Reinhard, Stanford, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/597,876

(22) Filed: Jun. 20, 2000

Related U.S. Application Data

(60) Provisional application No. 60/174,898, filed on Jan. 6, 2000.

(51) Int. Cl.[7] .............................. E21B 43/00; C02F 1/20
(52) U.S. Cl. ........................ 166/279; 166/300; 210/757
(58) Field of Search ................................ 166/279, 300, 166/261, 264; 210/757, 908; 435/262.5, 262

(56) References Cited

U.S. PATENT DOCUMENTS

| 5,069,286 | A | * | 12/1991 | Roesch et al. ............... 166/312 |
| 5,332,496 | A | * | 7/1994 | Rasouli et al. ............... 210/180 |
| 5,389,267 | A | * | 2/1995 | Gorelick et al. ............ 210/758 |
| 5,561,065 | A | * | 10/1996 | Schabron ...................... 436/28 |
| 5,575,927 | A | * | 11/1996 | Sivavec et al. ............. 210/757 |
| 5,587,317 | A | * | 12/1996 | Odom ...................... 435/262.5 |
| 5,753,122 | A | * | 5/1998 | Taylor et al. ................ 210/611 |

* cited by examiner

Primary Examiner—Frank S. Tsay
(74) Attorney, Agent, or Firm—L. E. Carnahan; Alan H. Thompson

(57) ABSTRACT

A system for remediating groundwater contaminated with halogenated solvents, certain metals and other inorganic species based on catalytic reduction reactions within reactive well bores. The groundwater treatment uses dissolved hydrogen as a reducing agent in the presence of a metal catalyst, such a palladium, to reduce halogenated solvents (as well as other substituted organic compounds) to harmless species (e.g., ethane or methane) and immobilize certain metals to low valence states. The reactive wells function by removing water from a contaminated water-bearing zone, treating contaminants with a well bore using catalytic reduction, and then reinjecting the treated effluent into an adjacent water-bearing zone. This system offers the advantages of a compact design with a minimal surface footprint (surface facilities) and the destruction of a broad suite of contaminants without generating secondary waste streams.

20 Claims, 1 Drawing Sheet

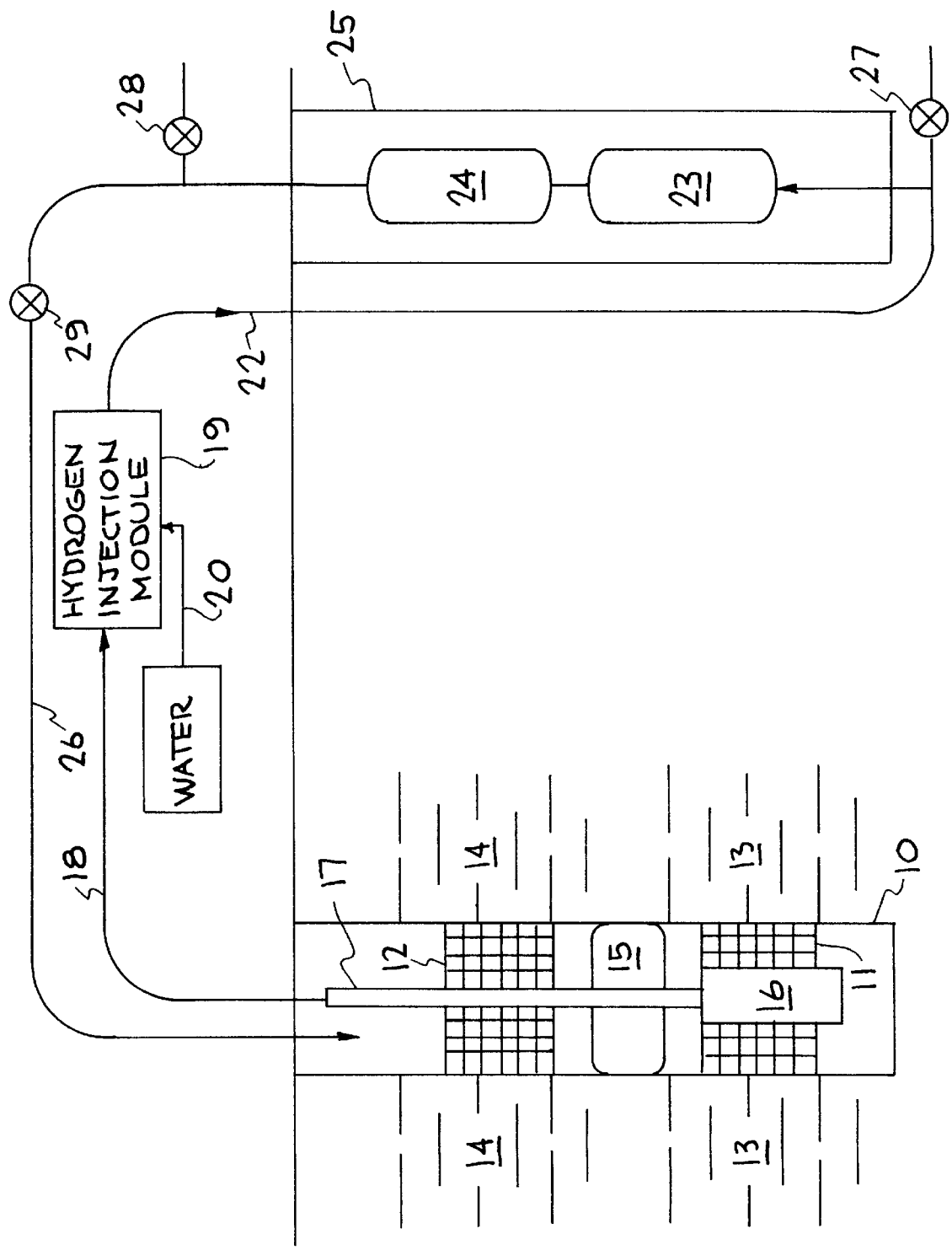

CATALYTIC DESTRUCTION OF GROUNDWATER CONTAMINANTS IN REACTIVE EXTRACTION WELLS

RELATED APPLICATION

This application relates to U.S. Provisional Application No. 60/174,898 filed Jan. 6, 2000, and claims priority thereof.

The United States Government has rights in this invention pursuant to Contract No. W-7405-ENG-48 between the United States Department of Energy and the University of California for the operation of Lawrence Livermore National Laboratory.

BACKGROUND OF THE INVENTION

This invention relates to the treatment of contaminated groundwater, particularly to remediation of groundwater contaminants with halogenated solvents, and more particularly to a system for such remediation of groundwater contaminants based on catalytic reduction reactions within reactive well bores.

Contamination of groundwater resources by halogenated solvents and metals poses a significant environmental problem. Existing conventional groundwater cleanup technologies suffer from a number of disadvantages, including the need to construct surface facilities and pipelines, and the need to deploy different technologies to treat different contaminants. One particular problem of concern is that many conventional treatment technologies merely transfer the contaminant from one medium (water) to another (e.g., activated carbon), thus producing a secondary waste stream. Recently, see U.S. Pat. No. 5,332,496 issued Jul. 26, 1994, to F. Rasouli, et al., a treatment technology has been developed involving catalytic reduction dehalogination by hydrogen with a palladium catalyst in a system located above the ground surface.

The present invention addresses the above mentioned problems, and provides a compact and versatile groundwater treatment system based on chemical reduction processes for deployment within the borehole of reactive treatment wells, and the boreholes may be pre-existing. This system has a minimal surface footprint and enables the destruction of a broad suite of contaminants without generating secondary waste streams. The treated groundwater and the harmless species produced by the catalytic reduction reactions are reinjected into an adjacent water-bearing zone. The treatment uses dissolved hydrogen as a reducing agent in the presence of a metal catalyst such as palladium.

SUMMARY OF THE INVENTION

It is an object of the present invention to provide catalytic destruction of groundwater contaminants in reactive extraction wells.

A further object of the invention is to provide treatment of contaminated groundwater without producing secondary waste streams.

A further object of the invention is to provide a system for treatment of contaminated groundwater, wherein the treatment process is within well bores thus significantly reducing the surface facilities and costs associated therewith.

Another object of the invention is to provide a system for remediating groundwater contaminated with halogenated solvents, certain metals, and other inorganic species based on catalytic reduction reactions within reactive well bores.

Another object of the invention is to provide contaminated groundwater treatment using dissolved hydrogen as a reducing agent in the presence of a metal catalyst, such as palladium, to reduce halogenated solvents (or other organic compounds) to harmless species, such as ethane or methane, and immobilize certain metals in lower valence states.

Other objects and advantages of the present invention will become apparent from the following description and accompanying drawing. The present invention involves a system for rapidly destroying chlorinated hydrocarbon contaminants that are dissolved in groundwater by catalyic reduction dehalogenation (CRD). CRD involves dissolved hydrogen as a reducing agent, in the presence of a palladium-on-alumina catalyst, for example. It is chemically transforms compounds such as Trichlovoethene (TCE) and tetrachloroethene (PCE) into environmentally-benign ethane without the accumulation of intermediate transformation products, such as vinyl chloride. The rapid reduction reactions allow the design of a reactor unit that is compact enough to be placed within a well bore. Using a dual-screen well configuration, contaminated water may be extracted from one portion of the subsurface, treated by a CRD reactor within a well bore, and then re-injected into another water-bearing zone. This CRD/reactive well system may be used to remediate contaminated groundwater in instances where treatment in surface facilities may be otherwise undesirable. The system may also be utilized for certain metals and other inorganic species, wherein the metals are reduced to lower valence states, and the other inorganic species reduced to harmless species.

BRIEF DESCRIPTION OF THE DRAWINGS

The accompanying drawing, which is incorporated into and forms a part of the disclosure, illustrates an embodiment of the invention and, together with the description, serves to explain the principles of the invention.

The single FIGURE schematically illustrates the system of the invention wherein groundwater contaminant treatment is essentially carried out in well bores.

DETAILED DESCRIPTION OF THE INVENTION

The present invention involves catalytic destruction of groundwater contaminants in reactive extraction wells. The system of this invention destroys reducible contaminants such as halogenated solvents, substituted aromatic hydrocarbons, nitrate, arsenate, selenate and related ions, and metal ions such as hexavalent chromium "downborehole." Catalytic destruction is effected using metal catalysts such as palladium, platinum, nickel, ruthenium, and alloys hereof along with a hydrogen source. The metal is deposited on material such as alumina, activated carbon, and hydrophobic zeolite. The treatment consists of placing relatively small but highly effective reactors "downborehole" into reactive wells, as illustrated in the single figure. The function of the reactive wells are to remove water from a contaminated water-bearing zone, destroy contaminants within a well bore, and then reinject the treated effluent into an adjacent water-bearing zone. Thus, the central components of the system consist of a dual-screened groundwater well, a pump, a pneumatic packer to prevent flow short-circuiting within the well-bore, a hydrogen source, and permeable vessels to house the catalyst material. Conceptually, the methodology of this invention is similar to other in-well treatment methods (e.g., air sparging wells) except that the water is treated down borehole and no secondary waste streams need to be treated.

The basis for the treatment process is that the toxicity of many groundwater contaminants is lowered when chemically reduced. For instance, halogenated compounds such as chlorinated and bromiated ethanes, ethylenes, benzenes, and phenols rapidly undergo reductive dehalogenation and are converted into harmless products (e.g., ethane, methane) in the presence of hydrogen and sufficient quantities of a metal catalyst such as palladium. Inorganic contaminants such as hexavalent chromium are reduced to less toxic and less mobile species (e.g., trivalent chromium).

Dissolved hydrogen, the reducing agent, may be supplied through a number of techniques, including direct injection and dissolution, chemical sources, or electrolysis of water. The key to the effectiveness of this treatment is the rapidity of the reactions which allows for short influent residence times within the catalyst bed and hence a compact design which may fill within a well bore. This process may compare favorably with biological treatment methods since harmful intermediates, such as vinyl chloride, have not been found to accumulate. Vinyl chloride has been found to transform at nearly the same rate as all other chlorinated ethenes.

An embodiment of the system of the present invention is schematically illustrated in the drawing. As shown, the system basically comprises a reactive extraction well 10 having a lower well screen 11 and an upper well screen 12, with the lower screen located contaminated water-bearing zone 13 and the upper screen in an adjacent treated or uncontaminated water-bearing zone 14, with a pneumatic packer 15 located therebetween. Well 10 is additionally provided with a submersible pump 16 located in the contaminated water zone 13 and a pipe 17 which extends to an upper section of well 10 above water-bearing zone 14, and as indicated by arrow 18 is constructed to connect to hydrogen (C) injection modules 19, having an $H_2$ source, indicated by arrow 20, connected thereto. As indicated by arrow 22, $H_2$ injection modules 19 are connected to a pair of catalyst columns 23 and 24 located in a well-bore 25, with catalyst column 24 connected by a pipe or line, indicated by arrow 26 which extends into treated water-bearing zone 14 of well 10. A pair of sample ports 27 and 28 are mounted at each end of the catalyst columns 23 and 24, and a valve 29 is mounted downstream of sample port 28. Thus, contaminated water from zone 13 is pumped through $H_2$ injection modules 19 through catalyst columns 23 and 24 wherein catalytic reduction reactions reduce contaminants to harmless species or metals to lower valence states, and the treated effluent is re-injected in to the water-bearing zone 14 of well 10. Thus, with the exception of the pipes or lines, indicated by arrows 18, 20, and 26, interconnecting well 10 and well-bore 25, and the $H_2$ injection modules 19, the treatment system is located below the ground surface, thus reducing to above-ground surface facilities of prior known treatment systems.

By way of example the well 10 and well-bore 25 are of an 8-inch diameter, with well 10 having a depth of 140 ft. The illustrated system is designed to operate at about 3 gallons per minute (gpm), but in low permeability of certain soils, the aquifer materials may limit the capacity to about 1 gpm. The system of this invention has been tested to treat groundwater contaminated with TCE, PCE and other chlorinated hydrocarbons, and the removal efficiencies for most was greater than 99%. Also, the system may be experimentally verified for use for treatment of certain metals, such as chromium arsenic, or uranium, by immobilization in lower valence states.

It has thus been shown that the present invention enables catalytic destruction of groundwater contaminants in reactive extraction wells, with significantly reduced surface facilities and provides the destruction of a broad suite of contaminants without generating secondary waste streams. The invention has a wide range of use applications for remediation of groundwater contaminated with halogenated solvents as well as certain metals and other inorganic constituents.

While a particular embodiment, materials, parameters, etc., have been illustrated and/or described to exemplify and teach the principles of the invention, such are not intended to be limiting. Modifications and changes may become apparent to those skilled in the art, and it is intended that the invention be limited only by the scope of the appended claims.

The invention claimed is:

1. A system for catalytic destruction of groundwater contaminants, comprising:

a well-bore extending through a water-bearing zone and at least into a contaminated water-bearing zone, a well screen mounted in the well bore and within each of said water-bearing zones, a pump mounted in said contaminated water-bearing zone, a pneumatic packer in said well-bore located intermediate said water-bearing zones, a hydrogen source operatively connected to said pump to receive contaminated water, at least one catalyst column connected to said hydrogen source to receive contaminated water and hydrogen, said at least one catalyst column being constructed to at least reduce halogenated solvents in the contaminated water to a harmless species, and said at least one catalyst column being connected to said well-bore such that effluent from said at least one catalyst column is directed into said well-bore and into said water-bearing zone.

2. The system of claim 1, wherein said at least one catalyst column is located in an adjacent well-bore.

3. The system of claim 1, wherein said hydrogen source includes $H_2$ injection modules.

4. The system of claim 1, wherein said hydrogen source is selected from the group consisting of direct $H_2$ injections and dissolution, chemical sources, and electrolysis of water.

5. The system of claim 1, wherein said at least one catalyst column includes a metal selected from the group consisting of palladium, platinum, nickel, ruthenium, and alloys thereof.

6. The system of claim 5, wherein said metal in said at least one catalyst column is deposited on materials selected from the group consisting of alumina, activated carbon, and hydrophobic zeolite.

7. The system of claim 6, wherein said at least one catalyst column contains a catalyst composed of palladium-on-alumina.

8. The system of claim 1, additionally including a second catalyst column, said catalyst columns being connected in series.

9. The system of claim 1, additionally including a pair of sampling port located before and after said at least one catalyst column.

10. The system of claim 1, additionally including a valve located intermediate said at least one catalyst column and said well-bore.

11. The system of claim 1, wherein said at least one catalyst column contains a catalyst which reacts with hydrogen to destroy reducible contaminants selected from the group consisting of halogenated solvents, substituted aromatic hydrocarbons, nitrate, arsenate, selenate and related ions, and metal ions.

12. A method to destroy reducible contaminants based on catalytic reduction reactions, comprising:

providing in a well-bore having a contaminated water-bearing zone and an uncontaminated water-bearing zone a pneumatic packer to prevent flow between said water-bearing zones, removing contaminated water from the contaminated water-bearing zone, directing the contaminated water into a source of hydrogen whereby the hydrogen is at least mixed with the contaminated water, providing at least one catalyst column containing a catalyst in which hydrogen is a reducing agent, directing the contaminated water/hydrogen through the at least one catalyst column whereby at least certain contaminants in the contaminated water undergo catalytic reduction reactions producing a harmless species, and directing the effluent from the at least one catalyst column into the well-bore and into the uncontaminated water-bearing zone.

13. The method of claim 12, wherein removing the contaminated water is carried out by providing a pump in the contaminated water-bearing zone, and providing a pipe connected to said pump and extending through the pneumatic packer and through the uncontaminated water-bearing zone for directing the contaminated water into the source of hydrogen.

14. The method of claim 12, additionally including providing the source of hydrogen from the group consisting of direct $H_2$ injection, chemical sources, and electrolysis of water.

15. The method of claim 12, additionally including providing the well-bore with a well screen located in each of the water-bearing zones.

16. The method of claim 12, additionally including forming the at least one catalyst column from material selected from the group consisting of alumnina, activated carbon, and hydrophobic zeolite, and a metal selected from the group consisting of palladium, platinum, nickel, ruthenium, and alloys thereof.

17. The method of claim 12, additionally including providing the at least one catalyst column with a catalyst composed of palladium-on-alumina.

18. The method of claim 12, additionally including providing a plurality of catalyst columns.

19. The method of claim 18, wherein the plurality of catalyst columns are connected in series.

20. The method of claim 12, additionally including positioning the at least one catalyst column in a well-bore.

* * * * *